US009756488B1

United States Patent
Caldwell et al.

(10) Patent No.: US 9,756,488 B1
(45) Date of Patent: Sep. 5, 2017

(54) ADVANCED AUTOMATIC LOOP DETECTION IN SHORT MESSAGE SERVICE (SMS) TWO-WAY MESSAGING

(71) Applicant: West Corporation, Omaha, NE (US)

(72) Inventors: Adam C. Caldwell, Omaha, NE (US); Geetha Gopalakrishnan, Omaha, NE (US); Kellan Stec, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 15/377,660

(22) Filed: Dec. 13, 2016

Related U.S. Application Data (63) Continuation of application No. 14/029,348, filed on Sep. 17, 2013, now Pat. No. 9,521,527.

(51) Int. Cl.
*H04W 4/00* (2009.01)
*H04W 4/14* (2009.01)
*H04L 29/08* (2006.01)
*H04W 88/02* (2009.01)

(52) U.S. Cl.
CPC .............. *H04W 4/14* (2013.01); *H04L 67/02* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2005/0227668 A1* | 10/2005 | Thorson | .................. | H04M 3/16 455/410 |
| 2009/0082042 A1* | 3/2009 | Harendra | .............. | H04L 12/585 455/466 |
| 2010/0229237 A1* | 9/2010 | Rusche | ................. | H04L 12/585 726/22 |
| 2010/0304768 A1* | 12/2010 | Murtagh | ............. | H04L 12/5855 455/466 |
| 2012/0322469 A1* | 12/2012 | Cai | ......................... | H04L 51/38 455/466 |

\* cited by examiner

*Primary Examiner* — Suhail Khan
(74) *Attorney, Agent, or Firm* — Raffi Gostanian (57) ABSTRACT

An advanced automatic loop detection apparatus and method in short message service (SMS) two-way messaging is provided. The apparatus may receive a reply message from a mobile device, and detect whether a loop is occurring when the reply message is received from the mobile device.

20 Claims, 6 Drawing Sheets

FIG. 6

ADVANCED AUTOMATIC LOOP DETECTION IN SHORT MESSAGE SERVICE (SMS) TWO-WAY MESSAGING

CROSS-REFERENCE TO RELATED APPLICATIONS

This application is a continuation from U.S. patent application Ser. No. 14/029,348, filed Sep. 17, 2013, entitled "ADVANCED AUTOMATIC LOOP DETECTION IN SHORT MESSAGE SERVICE (SMS) TWO-WAY MESSAGING", the entire contents of which is incorporated herein in its entirety by this reference.

FIELD

The present invention relates to loop detection systems and, more particularly, to an automatic loop detection system for two-way short message service (SMS) messaging.

BACKGROUND

When dealing with two-way SMS messaging, it is possible to have an auto-responder on a device that replies to any message that the device receives. For example, a user could have a responder that says the user is currently driving or is busy. However, when a two-way SMS application receives an unknown message, it usually replies with a help message or some other unrecognized input message. The problem generally arises when a mobile terminated (MT) message needs to be sent to a device with an auto-responder. This can trigger a loop where the MT message triggers a mobile originated (MO) message from the device, causing a loop to occur.

Further, it is cost prohibitive to implement a filter for all possible auto-responder messages, and also cost prohibitive and error prone to implement such a filter on a per-application basis. Thus, an improved system and process may be beneficial.

SUMMARY

Certain embodiments of the present invention may provide solutions to the problems and needs in the art that have not yet been fully identified, appreciated, or solved by current filters configured for loop detection. For example, some embodiments pertain to a loop detection system that is configured to detect a loop.

In one embodiment, an apparatus is provided. The apparatus includes an application dispatcher coupled to a database, and configured to receive a reply message from a mobile device. The database includes a loop detection procedure configured to detect whether a loop is occurring when the reply message is received from the mobile device.

In another embodiment, a computer-implemented method is provided. The computer-implemented method includes receiving, by a computing system, a reply message from a mobile device. The computer-implemented method also includes detecting, by the computing system, whether a loop is occurring when the reply message is received from the mobile device.

In yet another embodiment, a computer program is provided. The computer program is embodied on a non-transitory computer-readable medium. The computer program is configured to cause at least one processor to receive a reply message from a mobile device, and detect whether a loop is occurring when the reply message is received from the mobile device.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Embodiments of the present invention pertain to an advanced automatic loop detection system. In some embodiments, at the platform level, the SMS application dispatcher may route mobile originated (MO) messages to SMS applications. The SMS application dispatcher may store in a database the last MO message that was received from a mobile device, as well as store all mobile terminated (MT) messages that were sent to the mobile device. There is a storage procedure implemented in the database that is invoked each time a MO message is received. For example, the storage procedure may determine whether the MO message received is the same as the last MO message that was received and whether the MO message received was within a configurable window (typically 4 minutes). If a configurable threshold is met (e.g., 3 identical MO messages), then the storage procedure is configured to launch a configurable number of MT messages sent to the device (e.g., 3) in a configured timeframe. When all of the MT messages are identical, an error message is returned to the SMS application dispatcher. This informs the dispatcher that a loop has been detected. The MO message is then tagged as being suppressed, and no response to the MO message is generated.

Figure 1:
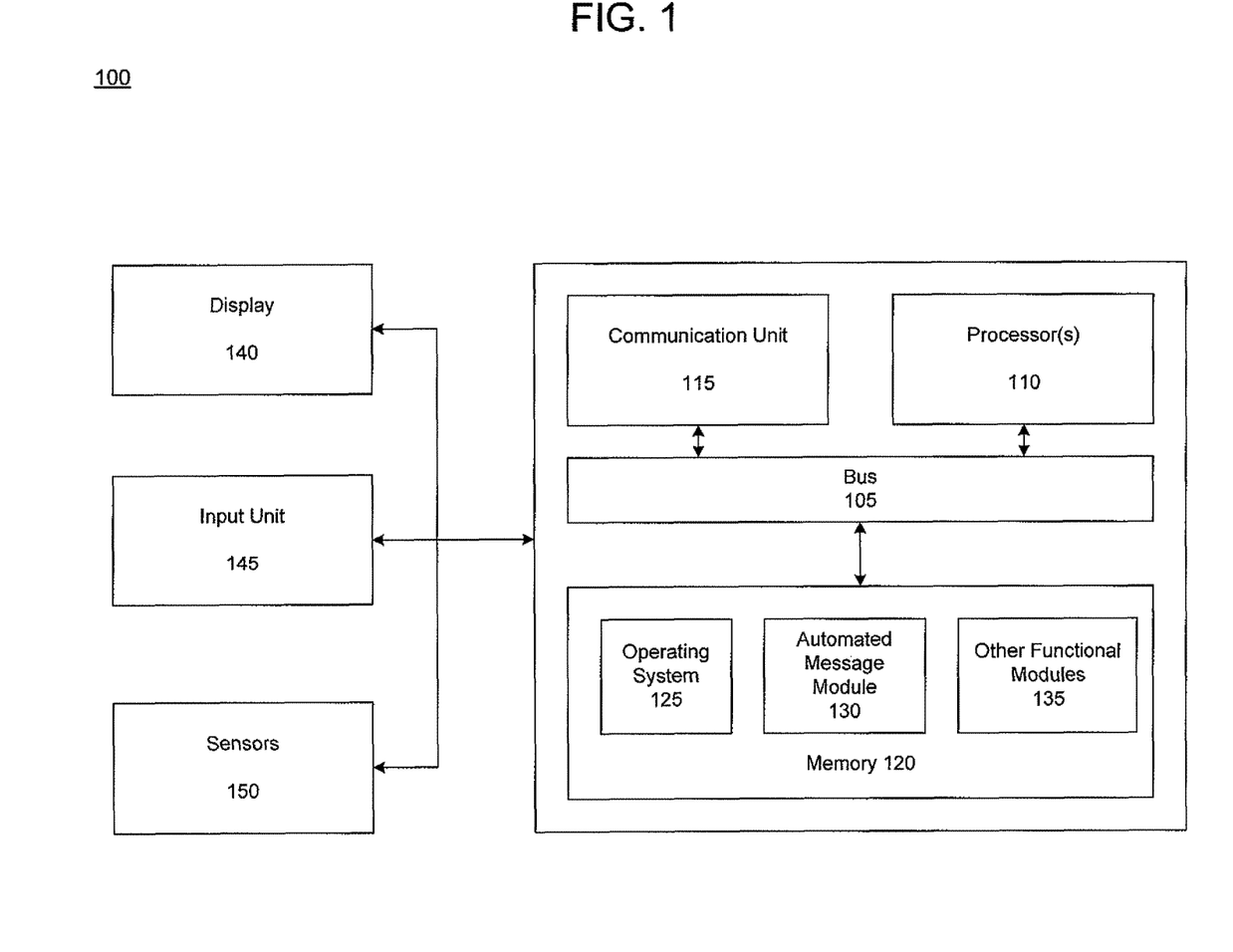
FIG. 1 illustrates a block diagram of a computing system, according to an embodiment of the present invention.

FIG. 1 illustrates a block diagram of a computing system 100, according to an embodiment of the present invention. Computing system 100 may include a bus 105, or other communication mechanism, configured to communicate information, and at least one processor 110, coupled to bus 105, configured to process information. At least one processor 110 can be any type of general or specific purpose processor. Computing system 100 may also include memory 120 configured to store information and instructions to be executed by at least one processor 110. Memory 120 can be comprised of any combination of random access memory ("RAM"), read only memory ("ROM"), static storage such as a magnetic or optical disk, or any other type of computer readable medium. Computing system 100 may also include a communication device 115, such as a network interface card, that may provide access to a network.

The computer readable medium may be any available media that can be accessed by at least one processor 110. The computer readable medium may include both volatile and nonvolatile medium, removable and non-removable media, and communication media. The communication media may include computer readable instructions, data structures, program modules, or other data and may include any information delivery media.

At least one processor 110 can also be coupled via bus 105 to a display 140, such as a Liquid Crystal Display ("LCD"). Display 140 may display information to the user, such as an automated message. A keyboard 145 and a cursor control unit 150, such as a computer mouse, may also be coupled to bus 105 to enable the user to interface with system 100.

According to one embodiment, memory 120 may store software modules that may provide functionality when executed by at least one processor 110. The modules can include an operating system 125 and an automated message module 130, as well as other functional modules 135. Operating system 125 may provide operating system functionality for computing system 100. Because computing system 100 may be part of a larger system, computing system 100 may include one or more additional functional modules 135 to include the additional functionality.

One skilled in the art will appreciate that a "system" could be embodied as a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 2:
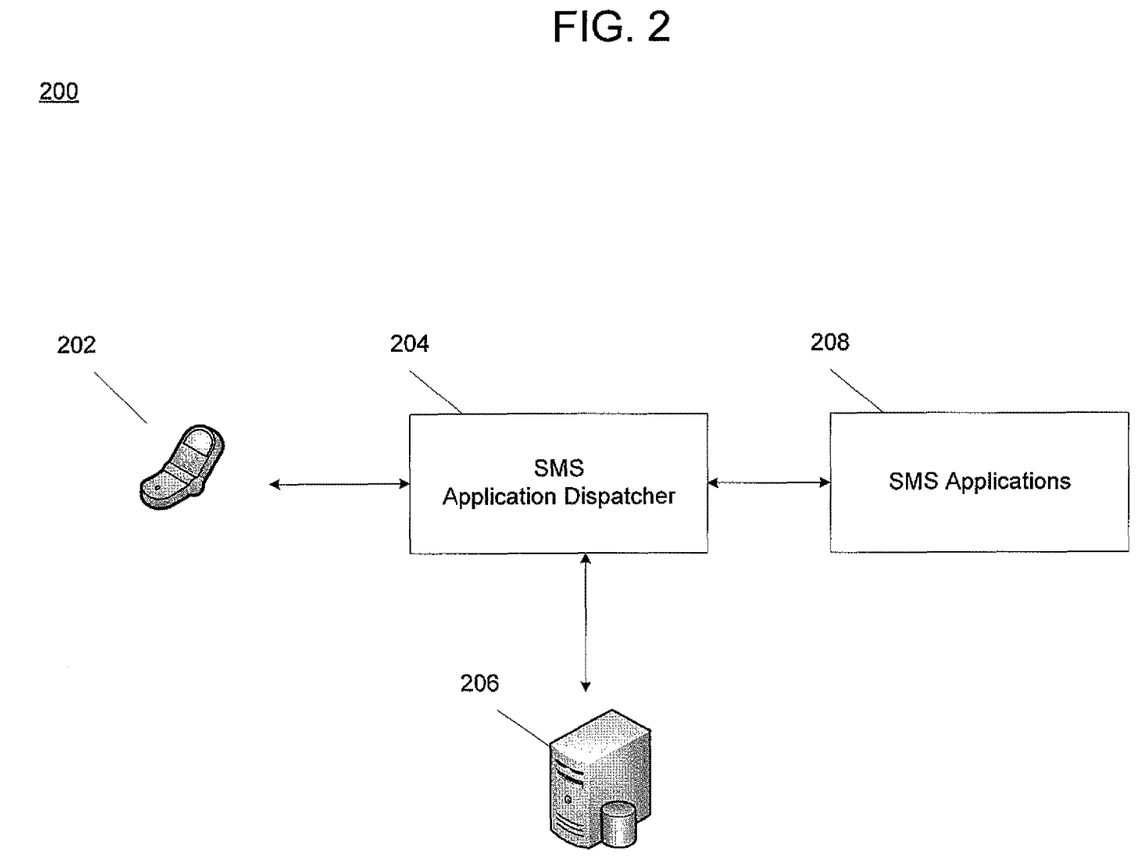
FIG. 2 is a block diagram illustrating a process for advanced loop detection, according to an embodiment of the present invention.

FIG. 2 is a block diagram 200 illustrating an advanced automatic loop detection system, according to an embodiment of the present invention. In this embodiment, the advanced automatic loop detection system includes a mobile device 202 configured to transmit a MO message to a SMS application dispatcher 204. SMS application dispatcher 204 may reside on a computing system similar to the computing system shown in FIG. 1 in some embodiments. Further, SMS application dispatcher 204, in this embodiment, includes a database 206 or may be coupled (or connected) to database 206. In other embodiments, database 206 may be separate (e.g., remote) from SMS application dispatcher 204, and SMS application dispatcher 204 may communicate with database 206 via the Internet, for example.

It should be appreciated that SMS application dispatcher 204 is configured to, at the platform level, route the MO message to SMS applications 208. SMS applications 208 may reside on separate computing systems or devices depending on the configuration of the advanced automatic loop detection system.

In this embodiment, SMS application dispatcher 204 may maintain (e.g., store) a record in database 206 of the previous MO message that was received from mobile device 202, as well as maintain a record of each MT message that was sent to mobile device 202.

Database 206 may also include a loop detection procedure. The loop detection procedure may be invoked each time a MO message is received by SMS application dispatcher 204. For instance, the loop detection procedure may determine whether the MO message received corresponds to the previously stored MO message and, if so, determine whether the MO message was received within a predefined period of time. In some embodiments, the predefined period of time may be four minutes. However, in other embodiments, the predefined period of time may be any time period that would be appreciated by a person of ordinary skill in the art.

When the MO message is received within the predefined period of time, the loop detection procedure is configured to load each MT message that was sent within the predefined period of time. If the loop detection procedure determines that each of the MT messages is identical, then an error message is returned to SMS application dispatcher 204. SMS application dispatcher 204 may then tag the MO message. The tag identifies the MO message as being suppressed to prevent any response message from being generated.

It should be noted that the SMS platform may transmit more MT messages than the MO messages it receives. This way, the performance impact of the above-described approach is minimal since the loop detection procedure is invoked on MO messages, and doesn't load the MT messages until a possible looping situation is identified.

Figure 3:
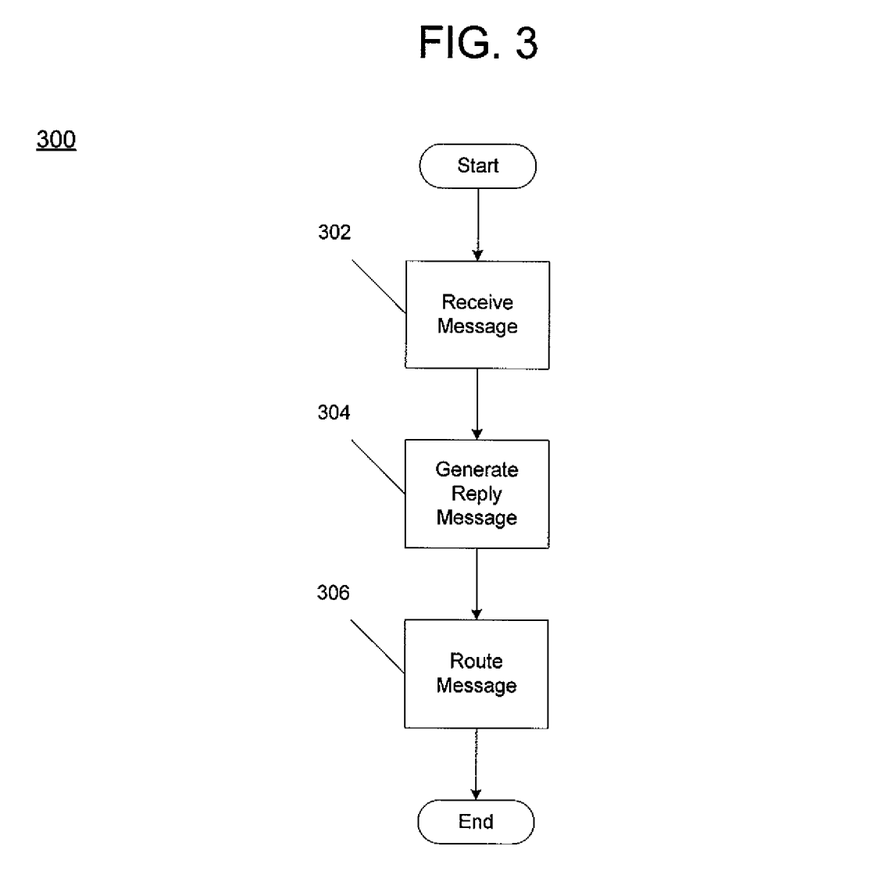
FIG. 3 is a flow diagram illustrating a process for generating a reply message, according to an embodiment of the present invention.

FIG. 3 is a flow diagram 300 illustrating a process for generating a reply message, according to an embodiment of the present invention. The process of FIG. 3 may be executed by a mobile device in some embodiments, as such as that shown in FIG. 2. In this embodiment, the process begins at 302 with a user of a mobile device receiving an automated message. The mobile device generates at 304 a reply message. The reply message is routed at 306 to an application dispatcher. In certain embodiments, the reply message is routed through a carrier of the mobile device, a delivery gateway, and a message queue.

In certain embodiments, a message queue is used to communicate between components. For example, the message queue allows the process to be scaled using additional instances when additional performance is required. The message queue implementation may allow different components to communicate with each other.

Figure 4:
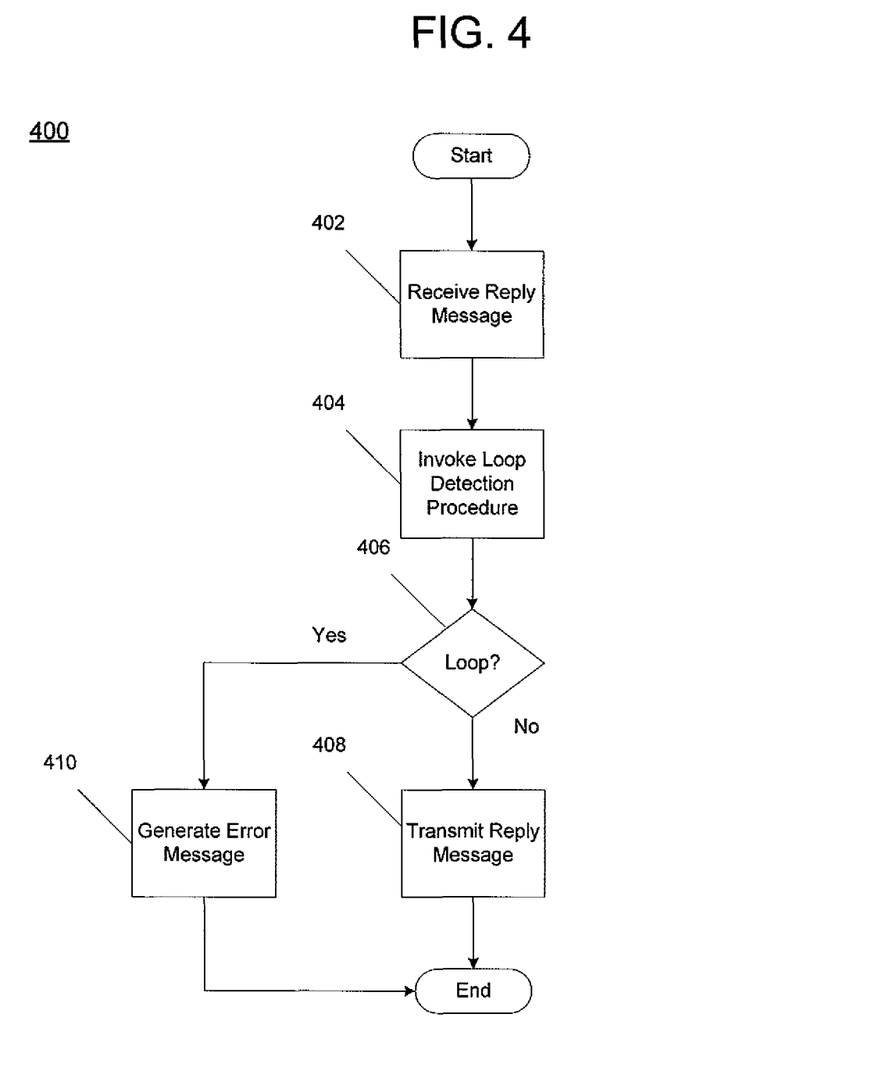
FIG. 4 is a flow diagram illustrating a process for detecting a loop, according to an embodiment of the present invention.

FIG. 4 is a flow diagram 400 illustrating a process for detecting a loop, according to an embodiment of the present invention. In this embodiment, the process begins with the application dispatcher receiving the reply message at 402. The application dispatcher at 404 invokes the loop detection procedure to determine whether a loop is occurring. The loop detection procedure in certain embodiment may be stored in a database associated with the application dispatcher. In some embodiments, the stored loop detection procedure, upon receiving the reply message, may apply logic to determine if a loop is occurring and suppress the return message.

At 406, the application dispatcher 404 determines whether the loop has been detected. If a loop has been detected, an error message is generated and the reply message is suppressed at 410. If a loop is not detected, the reply message is transmitted to at least one application browser via the messaging queue at 408.

Figure 5:
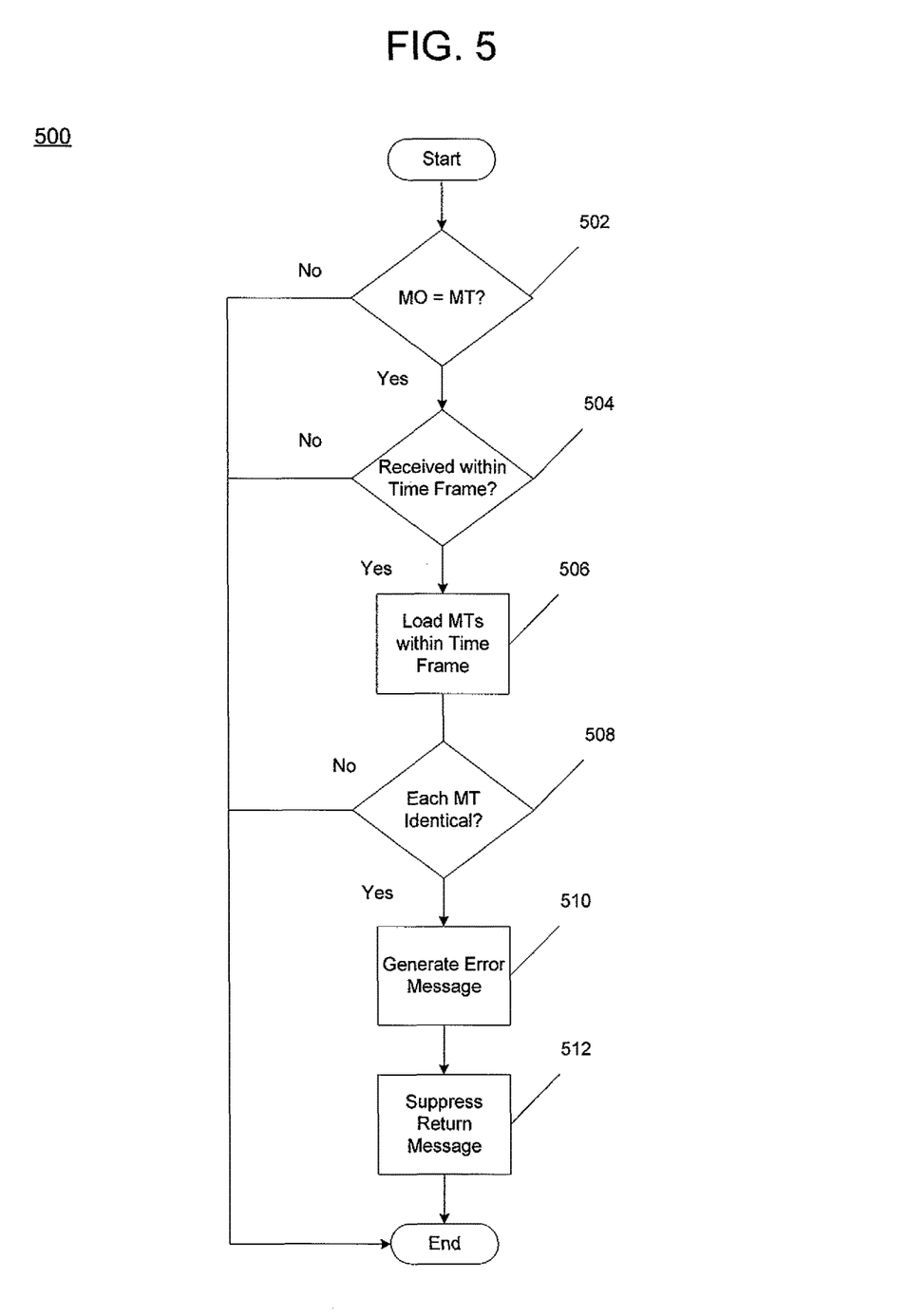
FIG. 5 is a flow diagram illustrating a process for generating an error message, according to an embodiment of the present invention.

FIG. 5 is a flow diagram 500 illustrating a process for generating an error message, according to an embodiment of the present invention. This process may be executed by a loop detection procedure stored on a database (or another storage device). In this embodiment, the process begins at 502 with determining whether the MO message (e.g., reply message) is the same as, or corresponds with, the MT message. If the MO message and the MT message are not the same, the process is terminated. If, however, the MO message is the same as the MT message, the application dispatcher at 504 determines whether the MO message was received within a predetermined period of time (i.e., within a certain time frame). If the MO was not received within the time frame, then the process is terminated.

If, however, the MO message was received within the time frame, each MT message that was generated within the time frame is loaded at 506. At 508, each of the generated MT messages is compared to determine whether they are identical to each other. If each of the generated MT messages is not identical, then the process is terminated. If, however, each of the generated MT messages is identical, then at 510 an error message is generated and at 512 the reply message is suppressed.

Figure 6:
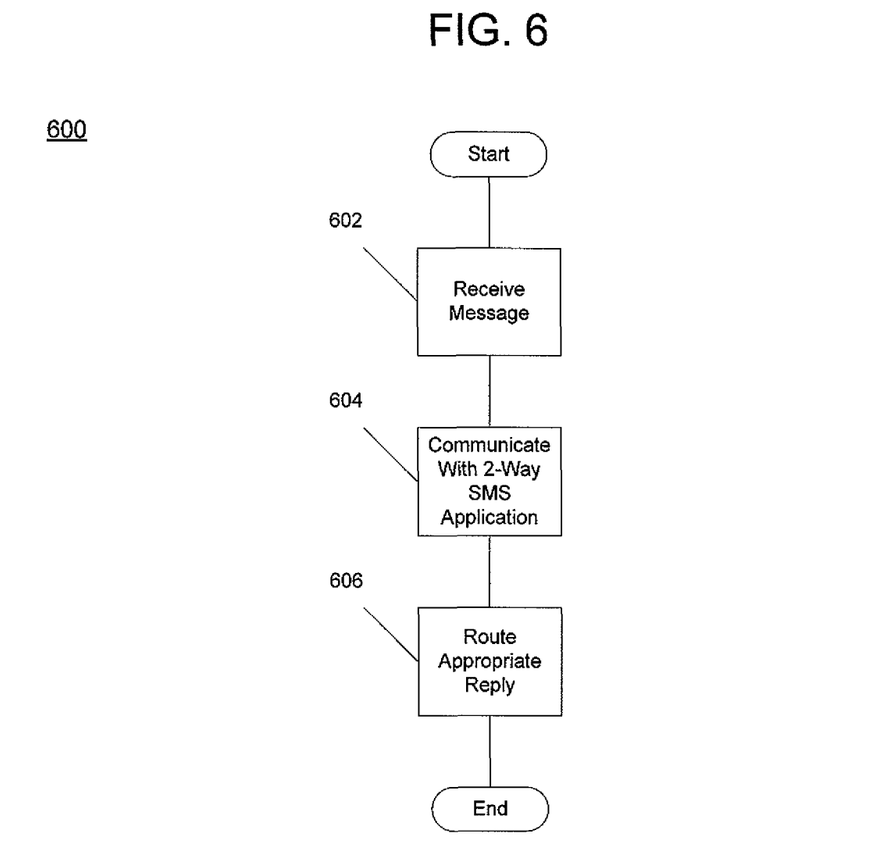
FIG. 6 is a flow diagram illustrating a process for communicating with a two-way SMS application, according to an embodiment of the present invention.

FIG. 6 is a flow diagram 600 illustrating a process for communicating with a two-way SMS application, according to an embodiment of the present invention. In this embodiment, if a loop is not detected, the reply message is received at 602 by at least one application browser via the messaging queue. The at least one application browser may communicate at 604 with a two-way short messaging service (SMS) application to determine an appropriate reply to the user of the mobile device. At 606, the at least one application browser may route the appropriate reply to the user of the mobile device. In some embodiments, the appropriate reply is transmitted via the messaging queue to the delivery gateway and then to the mobile device via the carrier. This process may be repeated again when the mobile device responds to the appropriate message with an automated message.

The process shown in FIGS. 3-6 may be performed, in part, by a computer program, encoding instructions for a nonlinear adaptive processor to cause at least the processes described in FIGS. 3-6 to be performed by the apparatuses discussed herein. The computer program may be embodied on a non-transitory computer readable medium. The computer readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 3-6, which may also be stored on the computer readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an application specific integrated circuit ("ASIC").

Embodiments of the present invention allow the SMS platform to transmit more MT messages than the SMS platform receives. Essentially, this means that the performance impact of this approach is minimal since it may be invoked on MO messages, and doesn't have to launch the MT messages until a possible looping situation is reached.

Further, this process is application agnostic and automatic, and is fully configurable, allowing it to be disabled or set a higher threshold. This approach is also cost effective because the logic is implemented at the platform level and does not require changes to the SMS application.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with an embodiment may be included in at least one embodiment of the invention. Thus, appearances of the phrases "in certain embodiments," "in some embodiments," "in other embodiments," or other similar language, throughout this specification do not necessarily all refer to the same embodiment or group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
an application dispatcher coupled to a database, and configured to receive a reply message from a mobile device;
wherein the database comprises a loop detection procedure configured to detect whether a loop is occurring when the reply message is received from the mobile device, wherein the loop detection procedure determines whether the reply message corresponds to a previous reply message and to an input message stored in the database that terminates at the mobile device as a mobile terminated message.

2. The apparatus of claim 1, wherein the loop detection procedure is configured to generate an error message to the application dispatcher.

3. The apparatus of claim 2, wherein the application dispatcher is configured to suppress the reply message when the error message is received from the database.

4. The apparatus of claim 1, wherein the application dispatcher is configured to transmit the reply message to at least one web application service to generate an appropriate message in response to the reply message.

5. The apparatus of claim 1, wherein the loop detection procedure is configured to determine whether the reply message corresponds to a mobile terminated message issued within a time frame.

6. The apparatus of claim 5, wherein the loop detection procedure is configured to determine whether the reply message was received within a predefined time frame.

7. The apparatus of claim 6, wherein the loop detection procedure is configured to load a plurality of mobile terminated messages generated within the predefined time frame.

8. The apparatus of claim 7, wherein the loop detection procedure is configured to determine whether the plurality of mobile terminated messages are identical.

9. The apparatus of claim 1, wherein the loop detection procedure is configured to determine whether the reply message was received within a predefined period of time of the previous reply message.

10. A method, comprising:
receiving a reply message from a mobile device by an application dispatcher coupled to a database;
wherein the database comprises a loop detection procedure configured to detect whether a loop is occurring when the reply message is received from the mobile device, wherein the loop detection procedure determines whether the reply message corresponds to a previous reply message and to an input message stored in the database that terminates at the mobile device as a mobile terminated message.

11. The method of claim 10, wherein the loop detection procedure is configured to generate an error message to the application dispatcher.

12. The method of claim 11, wherein the application dispatcher is configured to suppress the reply message when the error message is received from the database.

13. The method of claim 10, wherein the application dispatcher is configured to transmit the reply message to at least one web application service to generate an appropriate message in response to the reply message.

14. The method of claim 10, wherein the loop detection procedure is configured to determine whether the reply message corresponds to a mobile terminated message issued within a time frame.

15. The method of claim 14, wherein the loop detection procedure is configured to determine whether the reply message was received within a predefined time frame.

16. The method of claim 15, wherein the loop detection procedure is configured to load a plurality of mobile terminated messages generated within the predefined time frame.

17. The method of claim 16, wherein the loop detection procedure is configured to determine whether the plurality of mobile terminated messages are identical.

18. The method of claim 10, wherein the loop detection procedure is configured to determine whether the reply message was received within a predefined period of time of the previous reply message.

19. A non-transitory computer readable medium comprising instructions, that when read by a processor, cause the processor to perform:
receiving a reply message from a mobile device by an application dispatcher coupled to a database;
wherein the database comprises a loop detection procedure configured to detect whether a loop is occurring when the reply message is received from the mobile device, wherein the loop detection procedure determines whether the reply message corresponds to a previous reply message and to an input message stored in the database that terminates at the mobile device as a mobile terminated message.

20. The non-transitory computer readable medium of claim 19, wherein the loop detection procedure is configured to generate an error message to the application dispatcher.

* * * * *